Sept. 22, 1964   S. M. BAGNO   3,149,627
PLETHYSMOGRAPH
Filed April 25, 1962   4 Sheets-Sheet 1

INVENTOR
SAMUEL M. BAGNO
BY
ATTORNEY

INVENTOR
SAMUEL M. BAGNO
ATTORNEY

Sept. 22, 1964 S. M. BAGNO 3,149,627
PLETHYSMOGRAPH
Filed April 25, 1962 4 Sheets-Sheet 3

INVENTOR
SAMUEL M. BAGNO
BY
ATTORNEY

United States Patent Office 3,149,627
Patented Sept. 22, 1964

3,149,627
PLETHYSMOGRAPH
Samuel M. Bagno, 18 Columbus Ave., Belleville, N.J.
Filed Apr. 25, 1962, Ser. No. 191,394
12 Claims. (Cl. 128—2.1)

The present invention relates to diagnostics, and, more particularly, to an electrical plethysmograph which is an instrument for measuring the volume of blood flow in the blood circulatory system of a body.

It has been found that the electrical impedance of flowing blood can be measured by applying pairs of electrodes adjacent a body segment or section to sense the input current flow and the drop in voltage provided by a high frequency A.C. oscillator, and that the impedance varies with the volumetric displacement or flow of the blood, whereby the flow of blood can be determined. It likewise has been found that pulsating flow of blood effects fluctuation of the cross-sectional area of the body segment and corresponding fluctuations in the value of the impedance. Even when the body segment is restrained against fluctuation so that its cross-sectional area remains the same, as in the capillary blood vessel of a tooth, the impedance will fluctuate in response to pulsation.

It also has been found that the red corpuscles or cells of blood have a resistivity thousands of times of the blood serum in which they are suspended and are shaped like discs having a diameter of about 5 microns and a thickness of about 0.7 to 0.8 microns; and that laminar flow of blood in a capillary causes these discs to spin, whereby pulsations accelerate the spinning of the discs. Such spinning causes the discs to line up in a manner as though rolling along the wall of the capillary and thereby present the maximum moment of inertia to the axis of spin. When the discs are so aligned, the impedance value of the blood is reduced. Large molecules in the blood, due to their random thermal momentum, continuously strike the discs to throw them out of line, and the more slowly the discs spin, the easier it is to disturb their position.

It further has been found that during pulsating flow the red corpuscle discs never attain a steady state condition and that their position generally follows the integral of velocity or volumetric displacement of the flowing blood, wherefore the impedance follows the volumetric blood displacement and a recorded impedance curve represents the volumetric blood displacement curve so that volumetric displacement can be determined by measuring the impedance.

These findings can be summarized as follows:

(1) The change of impedance varies directly as the spinning velocity of the red cells.

(2) The spinning velocity is the integral of the acceleration over time.

(3) Since the red cell acceleration is directly proportional to the velocity of the blood serum, it follows that the change of impedance becomes proportional to the integral of the serum velocity over time, this being the volumetric blood displacement.

The above methods of measuring impedance give the same result, namely, that the impedance variations are a direct measurement of the volumetric displacement of the blood in the body segment under observation.

The foregoing findings and mathematical generalizations were conclusively proven by recent extensive laboratory experiments, with the electrical instrumentation and circuitry similar to that described herein. However, the circuitry previously employed for diagnostic use in actual practice was inadequate because the noise in the circuit disrupted the signal by which the impedance curve was recorded.

Accordingly, an object of the present invention is to overcome the foregoing difficulties by providing electrical plethysmograph apparatus wherein impedance fluctuation signals can be accurately plotted which have an amplitude of as low as 0.1% of the input amplitude.

Another object is to provide apparatus which can be utilized to simultaneously measure the volumetric blood displacement at a plurality of body segments.

Another object is to provide such apparatus which is adapted for use while employing the best known and most acceptable diagnostic techniques.

A further object is to provide such apparatus which is simple and economical in construction, compact in arrangement, and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein.

Figure 1:
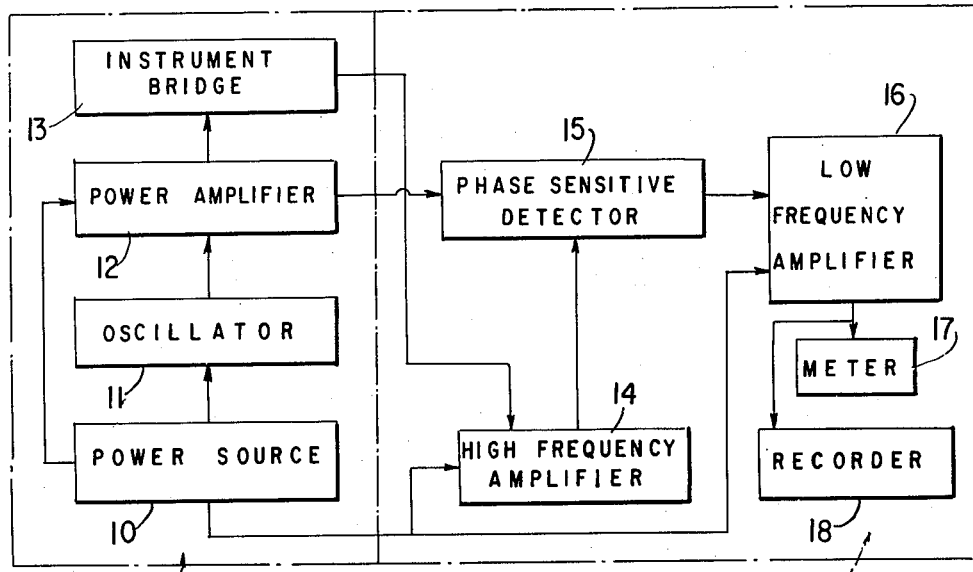
FIG. 1 is a block diagram of the electrical network of apparatus in accordance with the present invention.
Figure 3A:
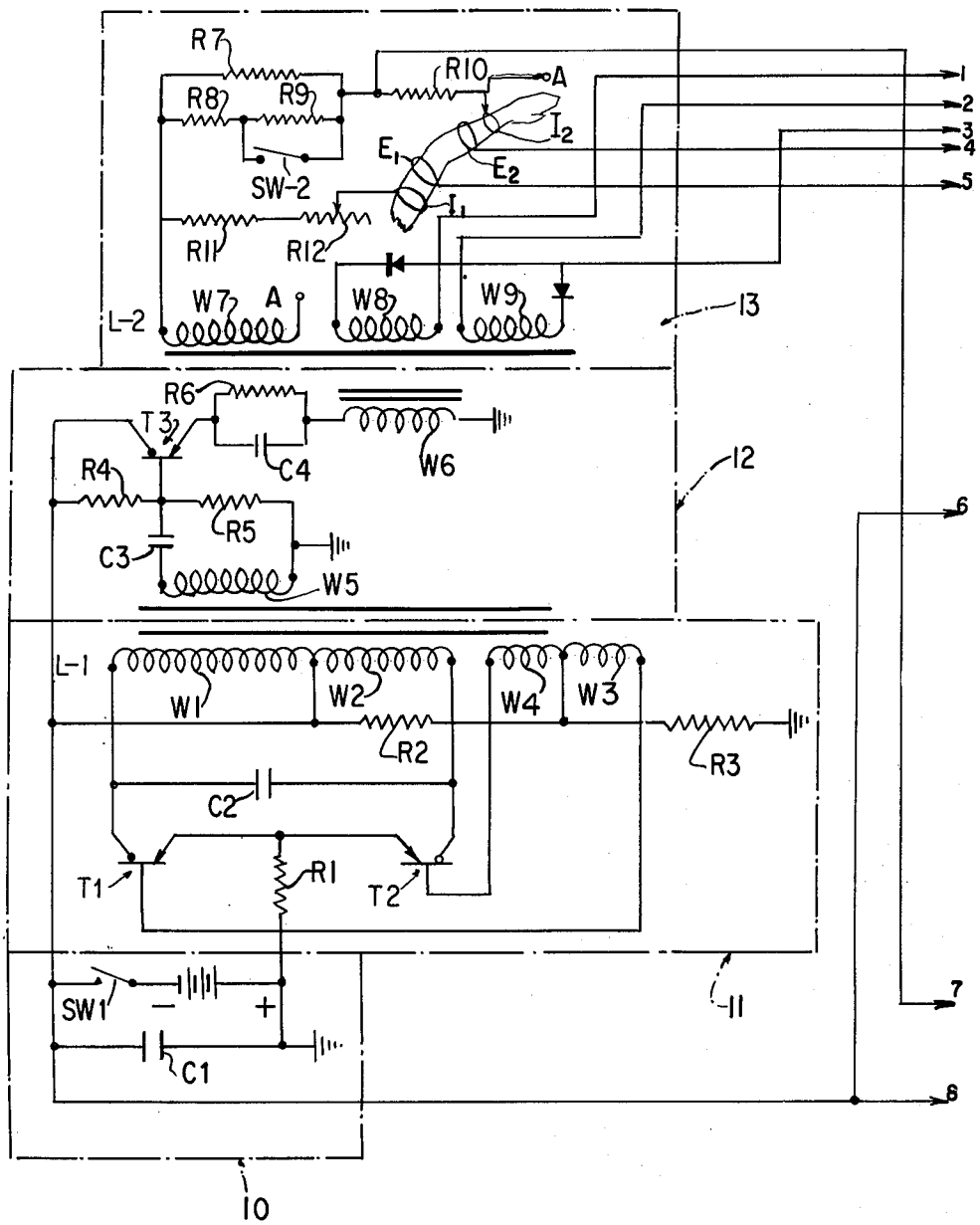
Figure 3B:
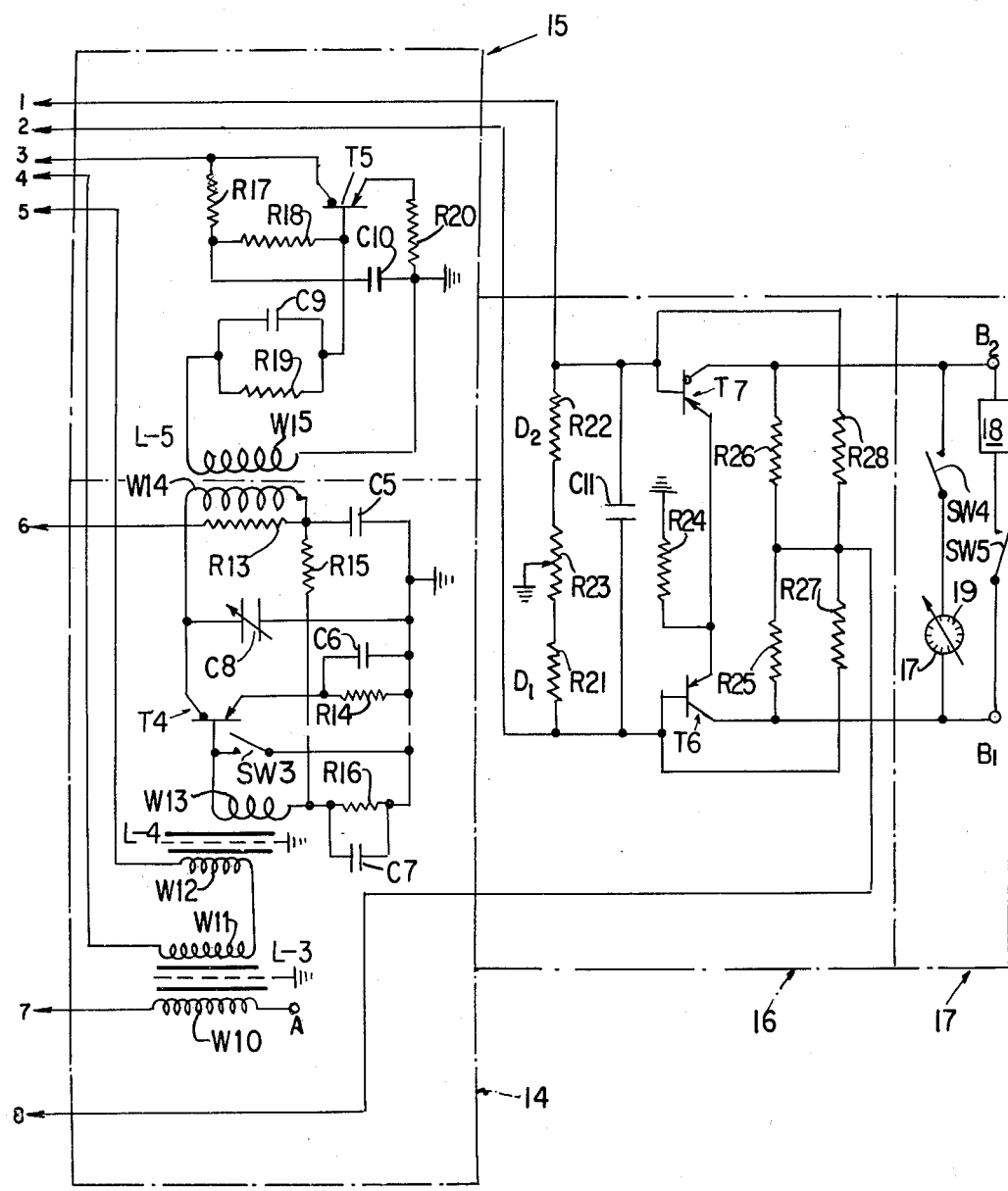

FIGS. 3A and 3B, taken together, constitute a circuit diagram of the network shown in FIG. 1.

Figure 4:
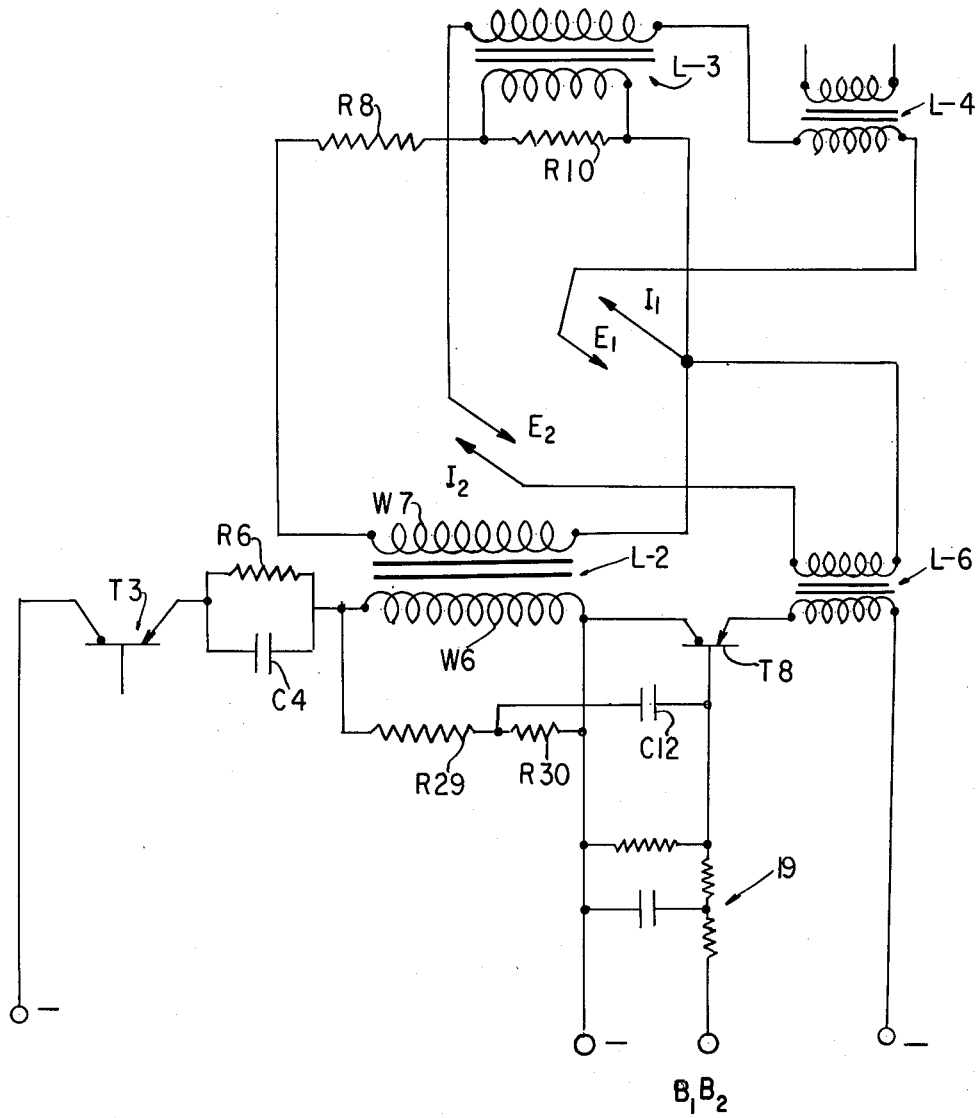

FIG. 4 is a portion of the circuit diagram shown in FIGS. 3A and 3B illustrating a modified arrangement.

Referring to FIG. 1 of the drawings in detail, there is shown a network which essentially comprises a D.C. power source 10, an oscillator 11, a power amplifier 12, a bridge 13 in the instrument having the electrodes for attachment to the body section, a high frequency amplifier 14, a phase sensitive detector 15, a low frequency amplifier 16, and a meter 17 and a recorder 18 connected for reading and recording the output of the amplifier 16. The source 10 powers the oscillator 11, and amplifiers 12, 14 and 16.

Basically, this network is arranged so that the oscillator 11 feeds a buffer stage of the power amplifier 12, and this buffer stage in turn is coupled through a transformer to the instrument bridge 13 which measures the impedance of the body segment or section to be tested. The impedance is measured by balancing the bridge, amplifying (at 14) the high frequency unbalance current of the bridge, and impressing the unbalance on the phase sensitive detector 15 where its phase is compared with the high frequency input voltage (at 12) of the bridge. The low frequency output of the phase detector is amplified (at 16) and registers on the meter 17 which preferably is of the zero center indicator type so that at balance the meter reads zero. If there is unbalance, the meter indicates the magnitude and the direction of unbalance. The pulsating changes of impedance, due to flow of blood, cause the bridge to unbalance slightly with each pulse, for example, somewhat less than 0.1%. These pulsations also are available at the output for recording (18).

In FIGS. 3A and 3B, the circuitry of the network just described is illustrated in detail with various sections corresponding to the sections shown in FIG. 1 being blocked in broken lines. In order to understand how the two portions FIG. 3A and FIG. 3B of this network are connected, the terminals at the right of FIG. 3A and the terminals at the left of FIG. 3B have corresponding reference numerals 1 through 8 applied thereto. The resistance and capacitance elements utilized in a practical network about to be described do not have their values applied thereto in the drawings for the sake of simplicity, nor are the number of turns of the transformer coils indicated.

The power source 10 comprises a six volt battery, an on and off switch SW-1 connected in series with the battery, and a 100 microfared capacitor $C_1$ connected across the battery and the switch and to ground.

The oscillator 11 is a push-pull 50 kc. transistor oscillator comprising transistors $T_1$ and $T_2$ having their emitters connected, a ground connection between the emitters having a resistor $R_1$ therein, a transformer $L_1$ having a primary winding including two center tapped coils $W_1$ and $W_2$ of 300 turn windings and two center tapped coils $W_3$ and $W_4$ of 50 turn windings and secondary coil $W_5$ of 600 windings, a 0.001 microfared capacitor $C_2$ connected across the coils $W_1$ and $W_2$ and across the collectors of the transistors $T_1$ and $T_2$, and a voltage divider composed of a 10K ohm resistor $R_2$ connected between the center taps of the coils $W_1$–$W_2$ and $W_3$–$W_4$ and to the battery and a 1K ohm resistor $R_3$ connected between the center tap of the coils $W_3$–$W_4$ and ground. The coils $W_3$–$W_4$ are connected across the bases of the transistors $T_1$ and $T_2$ whereby the divided voltage biases the bases of the transistors $T_1$ and $T_2$.

The oscillating transformer L–1 is tuned to 50 kc. by means of the capacitor $C_2$ and an adjustable iron core between the primary and secondary windings of the transformer L–1. The feedback to maintain oscillation is provided by the coils $W_3$–$W_4$ connected across the bases of the transistors $T_1$ and $T_2$. D.C. bias for the transistors $T_1$ and $T_2$ is obtained by the manner in which the bases thereof are connected to the coils $W_3$–$W_4$ and the arrangement of the voltage divider ($R_2$–$R_3$).

The power amplifier 12 is of the grounded collector type and comprises a transistor $T_3$ having its base coupled to one side of the winding $W_5$ by a 0.1 microfared capacitor $C_3$ and having its collector connected to one side of the battery and to its base through a resistor $R_4$, a 3K ohm resistor $R_5$ connected to the base of the transistor $T_3$ and the other side of the coil $W_5$, and a 100 ohm resistor $R_6$ and a 0.1 microfarad capacitor $C_4$ connected in parallel and connected between the emitter of the transistor $T_3$ and one side of the primary winding coil $W_6$ of a transformer $L_2$ having its other side connected to ground whereby the output of the buffer stage of the power amplifier 12 is fed to the coil $W_6$. The resistors $R_4$ and $R_5$ and the base of this transistor, as well as the resistor $R_6$, are used to obtain the correct D.C. bias for the transistor $T_3$.

The transformer $L_2$ further has a secondary winding including a 600 turn coil $W_7$ for coupling the power amplifier 12 to the instrument bridge 13, and two 600 turn coils $W_8$ and $W_9$ connected to the phase sensitive detector 15 and the low frequency output amplifier 16 in the manner described hereinafter.

The instrument bridge 13 is of the modified Kelvin double bridge type; and comprises first and second fixed ratio arms, a third variable resistance arm for balancing the bridge, and a fourth arm consisting of the body section under test.

The first arm of the bridge is composed of a 10K ohm resistor $R_7$ in parallel with a 100K ohm resistor $R_8$ connected in series with a 1K ohm resistor $R_9$ and a short circulating calibrating switch $SW_2$ is connected across the resistor $R_9$ to effect a 0.1% test impedance when this switch is closed.

The second arm of the bridge consists of a 200 ohm resistor $R_{10}$ connected between first arm and a terminal A of a coil $W_{10}$ (FIG. 3B).

The third arm of the bridge is composed of a 500 ohm resistor $R_{11}$ connected in series with a 28K ohm rheostat $R_{12}$ which is used for balancing the bridge.

The fourth arm of the bridge includes an electrode $I_1$ connected to the output of the rheostat $R_{12}$ and to one point of the body section under test, and an electrode $I_2$ connected between the second arm ($R_{10}$) and the terminal A and to a second point of the body section. The rheostat $R_{12}$ is used for impedance adjustments, but where fine adjustment of zero is necessary for close impedance standardization a 250 ohm vernier rheostat (not shown) can be connected in series with the lead of the electrode $I_1$.

The body section under test is shown herein by way of example as a forearm and the electrodes $I_1$ and $I_2$ applied thereto are shown schematically.

In order that the impedance measurement be insensitive to the impedance of the electrodes and the impedance of the skin in contact with the electrodes, the drop in potential across the body section under test is picked up by two electrodes $E_1$ and $E_2$ (also shown schematically) each adjacent an electrode $I_1$ and $I_2$ at the side of the electrodes $I_1$ and $I_2$ nearest each other. The voltage sensed by the electrodes $E_1$ and $E_2$ is the voltage against which the bridge is balanced. This is analogous to the functioning of a Kelvin double bridge which is made insensitive to contact resistance by balancing against the voltage drop within the resistance to be measured by the use of two independent voltage electrodes.

In the illustrative embodiment of the present invention, the voltage drop measured by the electrodes $E_1$ and $E_2$ is compared directly with the voltage drop across the resistor $R_{10}$. This is accomplished by providing a one-to-one transformer $L_3$ having a primary coil $W_{10}$ which connected across the resistor $R_{10}$ (at between the first and second bridge arms and terminal A—A) to sense its voltage, and having a secondary coil $W_{11}$ in series with a primary coil $W_{12}$ of a transformer $L_4$ connected between the electrodes $E_1$ and $E_2$. When the bridge is adjusted so that the two voltages in series are the same they buck each other and no voltage appears across the primary coil $W_{12}$. If there is an unbalance, the unbalanced voltage is received by the transformer $L_4$ and is fed to the input of the amplifier 14 which is coupled to the transformer $L_4$ by a secondary coil $W_{13}$.

The transformer $L_4$ is a high ratio step down transformer so that the impedance looking into it is several hundred thousand ohms. Because of the high impedance, this circuit becomes essentially a voltage sensing circuit which is substantially independent of the contact resistances of the voltage electrodes $E_1$ and $E_2$. Also, because the voltage drops in the third and fourth arms of the bridge have a ratio in the order of fifty to one, the current through the body section under test is independent within wide limits of the resistance of the current electrodes $I_1$ and $I_2$. Thus, by this four electrode connection to the body section, the measurements are maintained independent of electrode contact fluctuations.

This is required because the arterial pulses measured are less than 0.1% of the body section impedance.

The amplifier 14 essentially comprises a transistor $T_4$, an isolating circuit composed of a 10K ohm resistor $R_{13}$ and a 0.1 microfarad capacitor $C_5$ connected in series for isolating the power supply of the transistor $T_4$ from the oscillator power supply, and a balance switch $SW_3$ connected between the base of the transistor $T_4$ and ground.

The output of the transistor $T_4$ is coupled to the input of a transistor $T_5$ of the phase detector 15 by a transformer $L_5$ having a primary coil $W_{14}$ and a secondary coil $W_{15}$.

In the amplifier 14, the base of the transistor $T_4$ is connected to one side of the coil $W_{13}$, the collector is connected to one side of the coil $W_{14}$ and the emitter is connected to ground through a 220 ohm resistor $R_{14}$ and a 0.1 microfarad capacitor $C_6$ arranged in parallel. The other sides of the coils $W_{13}$ and $W_{14}$ are connected to each other and between the resistor $R_{13}$ and the capacitor $C_5$ through a 33K ohm resistor $R_{15}$, and the resistor $R_{13}$ and capacitor $C_5$ are connected between one side of the battery and ground. The other side of the coil $W_{13}$ is also connected to ground through a 2.2K ohm resistor $R_{16}$ and a 0.1 microfarad capacitor $C_7$ arranged in parallel. The first mentioned side of the coil $W_{14}$ and the collector of the transistor $T_4$ also are connected to ground through a variable capacitor $C_8$ adapted to tune the transformer primary $W_{14}$ to 50 kc. The secondary coil $W_{15}$ of this transformer is connected to the phase detector 15.

Figure 2:
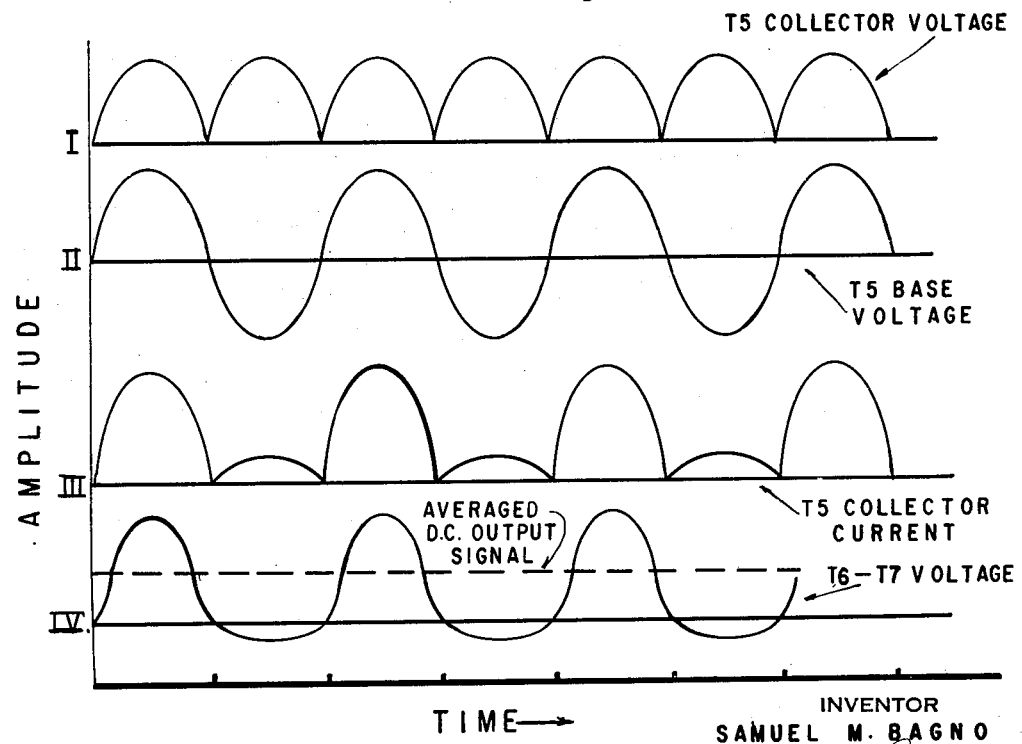
FIG. 2 is a plot of the wave-forms at various points in the network which produce the output signal capable of being measured and/or recorded.

The phase detector 15 consists essentially of a transistor $T_5$ having its collector alternately fed from the coils $W_8$ and $W_9$ of the transformer $L_2$, these voltages being half wave rectified by rectifiers $S_1$ and $S_2$. This results in a full wave 50 kc. rectified voltage (FIG. 2, line I) on the collector of the transistor $T_5$. The base of this transistor is biased by its collector by two 18K ohm resistors $R_{17}$ and $R_{18}$ connected in series, and is connected to one side of the coil $W_{15}$ of the transformer $L_5$ through a 10K ohm resistor $R_{19}$ and a 0.1 microfarad capacitor $C_9$ arranged in parallel. The emitter of this transistor is connected to the other side of the coil $W_{15}$ and to ground through a 220 ohm resistor $R_{20}$. The junction of the resistors 17 and 18 is connected to ground through a 0.1 microfarad capacitor $C_{10}$ which serves as a filter. The transformer $L_5$ feeds the amplified unbalanced 50 kc. alternating voltage to the base of the transistor $T_5$ (FIG. 2, line II). The detected output from the transistor $T_5$ feeds the low frequency output amplifier 16.

The low frequency output amplifier 16 essentially comprises a balancing resistor network $D_1$ and $D_2$ connected between the coils $W_8$ and $W_9$ of the transformer $L_2$ which includes three resistors in series, namely two 1K ohm resistors $R_{21}$ and $R_{22}$ and an intermediate voltage dividing resistor $R_{23}$ having its divider connected to ground, two transistors $T_6$ and $T_7$ having their emitters connected to each other and to ground through a 50 ohm resistor $R_{24}$, a 0.1 microfarad capacitor $C_{11}$ connected across the balancing resistor network and the bases of the two transistors, output terminals respectively connected to the collectors of the transistors $T_6$ and $T_7$, two 10K ohm resistors $R_{25}$ and $R_{26}$ in series connected across the terminals $B_1$ and $B_2$, and two 10K ohm resistors $R_{27}$ and $R_{28}$ in series connected across the bases of the two transistors with the junction of the resistors $R_{25}$ and $R_{26}$ connected to the junction of the resistors $R_{27}$ and $R_{28}$ and to battery.

The meter 17 and the recorder 18 can be connected across the output terminals $B_1$ and $B_2$ by switches $SW_4$ and $SW_5$, respectively, to read or record the output.

By arranging the phase detector 15 and the frequency low output amplifier 16 as shown and described herein, the collector current of the transistor flows through balancing resistor network $D_1$ and $D_2$ so that if the coil $W_8$ is the source of the half wave voltage it flows through $D_2$ and if the coil $W_9$ is the source of the half wave voltage it flows through $D_1$. When there is no signal on the base of the transistor $T_5$, both of these currents are alike and the D.C. component of the equal voltage drops across $D_1$ and $D_2$ subtract from each other and result in a zero D.C. voltage across the capacitor $C_{11}$ connecting $D_1$ and $D_2$. This capacitor likewise by-passes the A.C. components so that there is only D.C. across it.

If, however, there is an unbalanced signal coming in on the base of the transistor $T_5$, that base becomes more negative during one half of the wave and less negative during the other half of the wave. During the half wave when the base is more negative, the collector of this transistor is supplied by one of the coils $W_8$ or $W_9$, say coil $W_8$, and the current drawn from the coil $W_8$ is higher than if no signal were present. During the other half wave, the base of the transistor $T_5$ is less negative, the collector is supplied by the coil $W_9$, and the collector current is lower than during the other half wave (FIG. 2, line III). This would result in a greater D.C. voltage drop across $D_2$ than across $D_1$ and would provide a resultant voltage of one polarity across the capacitor $C_{11}$.

If the phase of the input signal to the base of the transistor $T_5$ should reverse itself, the current through $D_1$ would be greater and the polarity across the capacitor would likewise reverse itself. In that way the polarity across the capacitor $C_{11}$ is an indication of the direction of unbalance of the bridge and the magnitude of the voltage is an indication of the amount of unbalance.

The voltage across the capacitor $C_{11}$ is fed to the bases of the transistors $T_6$ and $T_7$ which serve as a push-pull amplifier for amplifying the signal. These transistors in conjunction with the resistors $R_{25}$ and $R_{26}$ in their respective collector circuits also form a bridge which is adjusted for balance when there is no signal coming through the amplifier 14. Such a no-signal condition can be simulated by momentarily short circuiting the transistor $T_4$ upon closing the switch $SW_3$ across the input of this transistor. During this zero input condition, the bridge can be balanced by closing the switch $SW_4$ to connect the microammeter 17 across the output terminals $B_1$ and $B_2$ and adjusting the voltage dividing resistor or potentiometer $R_{23}$ to provide a zero reading on the meter. After the output bridge is balanced, opening of the switch $SW_3$ enables the output ($B_1$–$B_2$) to indicate the condition of the Kelvin double bridge in which the body section or segment under test is connected.

The meter 17 and the recorder 18 indicate impedance which can be read directly on a scale 19 as the volumetric flow of blood because of the electrical impedance and blood flow relationship described earlier herein.

The electrodes $I_1$, $I_2$, $E_1$ and $E_2$ utilized in conjunction with the apparatus illustrated and described herein may be constructed and arranged to be applied to different sections of the body, for example, the head, torso, arms, legs, hands, feet, fingers and internally in the manner in which other diagnostic electrodes have been applied heretofore. However, the electrodes should have a contact area of at least one square centimeter which can be coated with an electrode paste or a cloth wetted with a saline solution in the conventional manner.

In the event the subject is not grounded in any other way, it is advisable to ground the electrode $I_2$ at A (FIG. 3A) and thereby avoid instabilities due to body capacity of the subject. When the impedance plethysmograph is used simultaneously with an electrocardiograph, as is contemplated because neither instrument will interfere with the other, the plethysmograph electrodes need not be grounded because the electrocardiograph takes care of such grounding. This is because the ground terminals of both instrument are connected to a common ground.

The present invention contemplates a diagnostic method wherein two or more impedance plethysmographs at different frequencies are used simultaneously on different segments of the same test subject. In such case only one electrode should be grounded. For example, if four plethysmographs each having four electrodes are used, all the plethysmographs are grounded at their respective ground terminals, but only one electrode of any one of the four plethysmographs should be grounded. None of the other fifteen electrodes should be grounded in order to prevent the measurements from interfering with each other.

For certain purposes it may be required to know accurately the resistance of the body segment being measured. In order to accomplish this, the electrodes $E_1$ and $I_1$ are removed from the body of the test subject after the correct balance has been established by balancing the potentiometer $R_{24}$ to cause the microammeter 17 to indicate zero; and these electrodes are connected together to one side of a standard resistance decade box. The other two electrodes $E_2$ and $I_2$ are likewise removed from the subject and are connected together to the other side of the decade box which side is grounded. The decade box resistance is then adjusted to cause the microammeter to again indicate zero, whereby the resistance indicated by the decade box is the resistance of the measured segment. A substitution box can be used for this purpose which comprises a four pole double throw rotary (anti-capacity) switch which connects the electrode $E_1$ to the test subject or the grounded decade box.

In FIG. 4, a modified portion of the circuit diagram of FIGS. 3A–3B is shown including at least in part the power amplifier 12, the instrument bridge 13 and the high frequency amplifier 14 wherein like elements or components of FIGS. 3A–3B and FIG. 4 are indicated by like reference numerals or legend.

The arrangement shown in FIG. 4 and about to be described provides for automatically balancing the instrument or body bridge 13 by utilizing the final output of the low frequency amplifier 16 at $B_1$–$B_2$ to control the gain of a transistor $T_8$. This transistor receives its input from the coil $W_6$ of the transformer $L_2$ and its output feeds the current electrodes $I_1$ and $I_2$ through a transformer $L_6$.

More specifically, the transistor $T_8$ has its emitter connected to its base and to one end of the coil $W_6$ and to one end of a voltage dividing resistor $R_{29}$, $R_{30}$ connected across the coil $W_6$; and has its collecter connected to the input coil of the transformer $L_6$. The base of the transistor $T_8$ is connected to a tap on the voltage dividing resistor $R_{29}$, $R_{30}$ through a capacitor $C_{12}$ to keep the D.C. voltage drop across $R_{30}$ from showing up across $T_8$ and varying its gain, so that the gain of $T_8$ will varry only according to the unbalanecd output from $B_1$, $B_2$.

A low-pass filter network 19 is connected between the output $B_1$, $B_2$ of the low frequency amplifier 16 and to the base of the transistor $T_8$ to pass the steady state unbalanced current so that it can control the gain of the transistor $T_8$ to balance the bridge 13. This filter network acts to slowly respond to the rapid fluctuations of impedance that are to be measured, whereby the steady state level of the outputs keeps the bridge in balance while allowing the pulses to get through.

If the current through the electrodes $I_1$ and $I_2$ is too high, the A.C. potential at $B_1$, $B_2$ will drop causing steady state bias on the transistor $T_8$ to drop whereby the gain of the transistor $T_8$ is reduced so that the output signal across the transformer $L_6$ from the transistor $T_8$ becomes less and tends to push or pull the body bridge 13 further into balance. If the gain of the system is proper, this feedback mechanism can make the signal current through the electrodes $I_1$, and $I_2$ always approach the value that is required to keep the bridge in a balanced condition.

The amount of residual unbalance as measured by the potential between $B_1$, $B_2$ and ground can provide a measure of the body impedance. This is so because the base voltage of transistor $T_8$ varies its collector current. The mutual conductance of the transistor $T_8$ is approximately proportional to the value of the collector current so that the mutual conductance becomes larger or smaller with the base voltage. Since the A.C. signal on the base of the transistor $T_8$ is fixed by the coil $W_6$, the mutual conductance times the A.C. base voltage becomes translated into the current across the body electrodes $I_1$ and $I_2$. In this manner, the current across the body electrodes is controlled by the unbalanced output of the body bridge 13.

The transistor $T_8$ is substituted for the resistor $R_{11}$ and the variable resistor $R_{12}$ to provide for automatic balance of the bridge 13.

From the foregoing description, it will be seen that the present invention provides a simple, practical, economical, accurate and reliable impedance plethysmograph which can be utilized in a number of ways to determine the volumetric flow of blood in a test subject.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In plethysmograph apparatus, the combination of two current input electrodes and two voltage drop measuring electrodes adapted to be applied in pairs across a body segment with one current electrode adjacent one voltage electrode and the other current electrode adjacent the other voltage electrode, an impedance measuring bridge having said current electrodes connected in one arm thereof and including variable means for adjusting the current through and the voltage drop across the body segment so that the sensitivity of the voltage measurement across the body section is always constant, a high frequency oscillator connected to said voltage electrodes and to said bridge to feed said bridge whereby the impedance of the segment under test causes a voltage drop between said voltage electrodes to unbalance said bridge, a transistorized phase sensitive detector network connected to said bridge for measuring the unbalance of said bridge and having an output of said detector, a network for amplifying the output to produce a signal, and an indicator responsive to the signal having a scale for indicating the impedance of the body segment under test at any specific instance in values of volumetric blood flow.

2. Apparatus according to claim 1, wherein said last mentioned network is a push-pull transistorized amplifier for amplifying the low frequency output of said detector network.

3. Apparatus according to claim 2, wherein a transistorized high frequency amplifier is connected to the output of said bridge and feeds said detector network.

4. Apparatus according to claim 2, wherein said bridge includes a resistor providing a voltage drop thereacross for maintaining the sensitivity of said bridge to a substantially constant percentage variation within given parameters and means including a series of variable impedances for adjusting that voltage drop within given parameters to a substantially constant level, and wherein said high frequency amplifier is arranged to substitute that voltage drop from a constant voltage supply of the same value so that any percentage variation in the measured impedance will give a fixed voltage drop.

5. Apparatus according to claim 4, wherein said bridge is provided with means for simulating a fixed percentage of change of impedance to effect standardization at constant voltage.

6. Apparatus according to claim 5, wherein said last mentioned means include a resistor and a switch for shunting out said last mentioned resistor.

7. Apparatus according to claim 1, wherein a transistorized high frequency amplifier is connected to the output of said bridge and feeds said amplified bridge output to said detector network.

8. Apparatus according to claim 1, wherein said high frequency oscillator is a push-pull oscillator.

9. Apparatus according to claim 1, wherein connections are arranged to isolate said bridge from ground.

10. Apparatus according to claim 1, wherein said variable means is a variable resistor for balancing said bridge.

11. Apparatus according to claim 1, wherein a transistor is connected in said bridge and has its input connected to the output of said high frequency oscillator and its output feeds said current electrodes, and said last mentioned transistor is connected to said signal producing network to be controlled by the signal to maintain said bridge in balance.

12. Apparatus according to claim 11, wherein said signal producing network has a low-pass filter connected therein so that said bridge remains in balance only during slow fluctuations but will not remain in balance during faster fluctuations at about heart beat pulse frequencies, whereby such pulse frequencies unbalance bridge and can be detected.

References Cited in the file of this patent
UNITED STATES PATENTS

| | | |
|---|---|---|
| 2,290,091 | Brown | July 14, 1942 |
| 2,801,629 | Edmark | Aug. 6, 1957 |
| 2,865,365 | Newland | Dec. 23, 1958 |
| 2,944,542 | Barnett | July 12, 1960 |